United States Patent
Mashimo et al.

(10) Patent No.: US 12,080,870 B2
(45) Date of Patent: *Sep. 3, 2024

(54) METHOD OF PRODUCING ELECTRODE FOR SECONDARY BATTERY

(71) Applicant: Prime Planet Energy & Solutions, Inc., Tokyo (JP)

(72) Inventors: Naohiro Mashimo, Toyota (JP); Katsushi Enokihara, Toyota (JP); Haruka Shionoya, Toyota (JP); Masanori Kitayoshi, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 17/692,191

(22) Filed: Mar. 11, 2022

(65) Prior Publication Data

US 2022/0293905 A1    Sep. 15, 2022

(30) Foreign Application Priority Data

Mar. 12, 2021  (JP) ................................. 2021-040443

(51) Int. Cl.
  *H01M 4/04*  (2006.01)
  *H01M 4/02*  (2006.01)

(52) U.S. Cl.
  CPC ....... *H01M 4/0435* (2013.01); *H01M 4/0404* (2013.01); *H01M 2004/021* (2013.01)

(58) Field of Classification Search
  CPC ..... B29C 64/218; B29C 55/18; B29C 53/043; B29C 44/485; B29C 43/46;
  (Continued)

(56) References Cited

U.S. PATENT DOCUMENTS

2010/0040949 A1    2/2010  Nanno et al.
2011/0091754 A1    4/2011  Miyahisa et al.
(Continued)

FOREIGN PATENT DOCUMENTS

CN    1285959 A    2/2001
CN    101611508 A    12/2009
(Continued)

*Primary Examiner* — Stella K Yi
(74) *Attorney, Agent, or Firm* — HAUPTMAN HAM, LLP

(57) ABSTRACT

A method of producing an electrode disclosed here includes a step in which a moisture powder formed of agglomerated particles; a step in which by using the moisture powder, a coating film composed of the moisture powder is formed on an electrode current collector, with a gas phase of the coating film being remained so that the average film thickness of the coating film is 50 μm or more; a step in which the coating film on the current collector is transported, concavo-convex transfer is performed using a roll mold, and thus at least one groove extending in the transport direction is formed in a center of a surface part of the coating film, with the groove being formed to have a depth satisfying $(9/10 \times t_1) > t_2$; and a step in which the coating film formed on the current collector is dried to form an electrode active material layer.

4 Claims, 5 Drawing Sheets

(58) Field of Classification Search
CPC ............ B29C 2043/3422; B29C 43/08; B29C 59/106; H01M 4/0404; H01M 4/0435; H01M 10/00
See application file for complete search history.

(56) References Cited

U.S. PATENT DOCUMENTS

| | | |
|---|---|---|
| 2016/0013469 A1 | 1/2016 | Tajima et al. |
| 2018/0159114 A1 | 6/2018 | Tanihara et al. |
| 2019/0386331 A1 | 12/2019 | Lin et al. |
| 2020/0136125 A1 | 4/2020 | Suenaga et al. |
| 2022/0293904 A1* | 9/2022 | Mashimo ............ H01M 4/0404 |

FOREIGN PATENT DOCUMENTS

| | | |
|---|---|---|
| CN | 102017237 A | 4/2011 |
| CN | 107004837 A | 8/2017 |
| CN | 110521032 A | 11/2019 |
| EP | 0967672 A1 | 12/1999 |
| JP | 2000-348713 A | 12/2000 |
| JP | 2002-015764 A | 1/2002 |
| JP | 2005285607 A | 10/2005 |
| JP | 2008010253 A | 1/2008 |
| JP | 2008027633 A | 2/2008 |
| JP | 2014-165156 A | 9/2014 |
| JP | 2014199738 A | 10/2014 |
| JP | 2015-032554 A | 2/2015 |
| JP | 2015-46410 A | 3/2015 |
| JP | 2015-053204 A | 3/2015 |
| JP | 2015-138619 A | 7/2015 |
| JP | 2015-159089 A | 9/2015 |
| JP | 201618725 A | 2/2016 |
| JP | 2016-066594 A | 4/2016 |
| JP | 2016-119261 A | 6/2016 |
| JP | 2017228349 A | 12/2017 |
| JP | 2018041921 A | 3/2018 |
| JP | 2018-137087 A | 8/2018 |
| JP | 2018186033 A | 11/2018 |
| JP | 2019-057383 A | 4/2019 |
| JP | 2019-087343 A | 6/2019 |
| JP | 2020161303 A | 10/2020 |

* cited by examiner

METHOD OF PRODUCING ELECTRODE FOR SECONDARY BATTERY

CROSS REFERENCE TO RELATED APPLICATIONS

Priority is claimed on Japanese Patent Application No. 2021-040443, filed Mar. 12, 2021, the content of which is incorporated herein by reference.

BACKGROUND OF THE DISCLOSURE

1. Technical Field

The present disclosure relates to a method of producing an electrode for a secondary battery.

2. Description of Background

Secondary batteries such as lithium ion secondary batteries are lighter in weight and have a higher energy density than conventional batteries, and thus are suitably used as high-output power supplies for mounting on vehicles or power supplies for computers and mobile terminals. As a typical structure of a positive electrode and a negative electrode (hereinafter simply referred to as an "electrode" when positive and negative electrodes are not particularly distinguished) included in this type of secondary battery, one in which an electrode active material layer containing an electrode active material as a main component is formed on one surface or both surfaces of a foil-like electrode current collector may be exemplified.

This electrode active material layer is formed by applying a slurry (paste) electrode material prepared by dispersing solid components such as an electrode active material, a binding material (binder), and a conductive material in a predetermined solvent to a surface of an electrode current collector to form a coating film, drying the coating film, and then applying a pressing pressure to obtain a predetermined density and thickness. Secondary batteries are required to have higher performance, and one approach to achieving such higher performance is to increase the capacity. In order to increase the capacity of a secondary battery, for example, electrodes are made thicker than those in the related art.

When an electrode material (coating film) is thickly applied to an electrode current collector and dried in order to thicken the electrode, drying contraction of the coating film also increases, and accordingly, cracks and wrinkles at irregular intervals tend to occur in the dried coating film. In addition, in order to shorten the time for a drying step, the drying temperature (temperature in the drying furnace) is set to be high and the transport speed in the drying step is increased. However, in such a case, cracks and wrinkles that reach the electrode current collector tend to occur. The occurrence of such cracks and wrinkles is not preferable because the occurrence of may cause deterioration of battery performance such as a decrease in the capacity and generation of foreign substances.

Generally, in such cracks and wrinkles at irregular intervals, a solvent (liquid component) between solid components such as an active material and a binder rapidly evaporates (volatilizes), and thus the solid components pull each other, and tensile stress occurs in the coating film. In the active material layer, since parts in which solid components are strongly bonded to each other and parts in which solid components are weakly bonded to each other are irregularly present, when tensile stress is generated in the coating film, cracks and wrinkles occur in parts in which the bond is weak. On the other hand, Japanese Patent Application Publication No. 2015-46410 discloses a method in which a barrel transport roller is arranged to make it unlikely for tensile stress to remain inside the coating film, and a dried electrode (coating film) is unlikely to crack.

SUMMARY

Here, according to the results of examination performed by the inventors, it has been found that cracks and wrinkles at irregular intervals occurring in a dried coating film (electrode) are unevenly distributed in a central part rather than at an end in a width direction orthogonal to a transport direction of an electrode current collector, and tend to occur in the transport direction. This is because, when an electrode current collector that is stretched with a certain force is transported in the transport direction, and is heated in a drying step, the current collector can extend in the transport direction and at the same time can contract in the width direction. As described above, the coating film also undergoes drying contraction due to the tensile stress remaining in the coating film, but the coating film cannot conform to deformation of the current collector, and wrinkles and cracks are unevenly distributed in the central part of the dried coating film (electrode) at irregular intervals.

The present disclosure has been made in view of such circumstances, and a main object of the present disclosure is to provide a method of producing an electrode in which conformability of a coating film with respect to an electrode current collector is improved and thus the occurrence of cracks and wrinkles at irregular intervals is minimized.

In order to achieve the above object, there is provided a method of producing an electrode for a secondary battery. The method of producing an electrode disclosed here is a method of producing an electrode having any electrode current collector of positive and negative electrodes and an electrode active material layer, the method including: a step in which a moisture powder formed of agglomerated particles containing at least an electrode active material, a binder resin, and a solvent is prepared, with a solid phase, a liquid phase, and a gas phase in at least 50 number % or more of the agglomerated particles forming a pendular state or a funicular state in the moisture powder; a step in which by using the moisture powder, a coating film composed of the moisture powder is formed on the electrode current collector, with a gas phase of the coating film being remained, and with an average film thickness $t_1$ (μm) of the coating film being 50 μm or more; a step in which the coating film on the current collector is transported, concavo-convex transfer is performed using a roll mold, and thus at least one groove extending in a transport direction is formed in a center of a surface part of the coating film, with the groove being formed to have a depth $t_2$ (μm) satisfying $(9/10 \times t_1) \geq t_2$; and a step in which the coating film formed on the current collector is dried to form an electrode active material layer.

With such a configuration, when at least one groove extending in a transport direction in the center of the surface part of the coating film is formed, the conformability of the coating film with respect to deformation of the electrode current collector is improved. Thereby, it is possible to produce a high-quality electrode in which uneven distribution of cracks and wrinkles at irregular intervals in the central part of the coating film is minimized.

In one preferable aspect of the method of producing an electrode disclosed here, in the moisture powder prepared in the step in which the moisture powder is prepared, when a bulk specific gravity measured by putting a moisture powder (g) into a container having a predetermined volume (mL) with leveling and without applying a force is set as a loose bulk specific gravity X(g/mL), and a specific gravity calculated from the composition of the moisture powder assuming that there is no gas phase is set as a true specific gravity Y(g/mL), a ratio: Y/X of the true specific gravity Y to the loose bulk specific gravity X is 1.2 or more.

With such a configuration, it is possible to more suitably form grooves extending in the transport direction on the coating film before the drying step.

In one preferable aspect of the method of producing an electrode disclosed here, in the step in which the groove extending in the transport direction is formed, the groove may be formed in plurality on the coating film. In addition, in another preferable aspect, in the step in which the groove extending in the transport direction is formed, a groove present in a central part in the width direction may be formed to be deeper than a groove present at the end of the coating film in a width direction orthogonal to the transport direction.

With such a configuration, it is possible to improve conformability of the coating film with respect to the electrode current collector, and suitably minimize cracks and wrinkles at irregular intervals.

DETAILED DESCRIPTION

Hereinafter, preferable embodiments of a method of producing an electrode disclosed here will be described using an electrode suitably used for a lithium ion secondary battery, which is a typical example of a secondary battery, as an example. Here, components other than those particularly mentioned in this specification that are necessary for implementation can be recognized by those skilled in the art as design matters based on the related art in the field. The method of producing an electrode disclosed here can be implemented based on content disclosed in this specification and common general technical knowledge in the field.

Here, the sizes (a length, a width, a thickness, etc.) do not reflect actual sizes.

In addition, the notation "A to B (where A and B are arbitrary values)" indicating a range in this specification means A or more and B or less.

In the present specification, "secondary battery" generally refers to a power storage device that can be repeatedly charged, and includes a so-called storage battery (that is, a chemical battery) such as a lithium ion secondary battery, a nickel metal hydride battery, and a nickel cadmium battery, as well as an electric double layer capacitor (that is, a physical battery). In addition, in the present specification, "lithium ion secondary battery" refers to a non-aqueous electrolyte solution secondary battery that uses lithium ions as a charge carrier and realizes charging/discharging by transferring charges associated with lithium ions between positive and negative electrodes. In this specification, when there is no need to particularly distinguish a positive electrode and a negative electrode, they are simply described as an electrode.

Method of Producing Electrode

Figure 1:
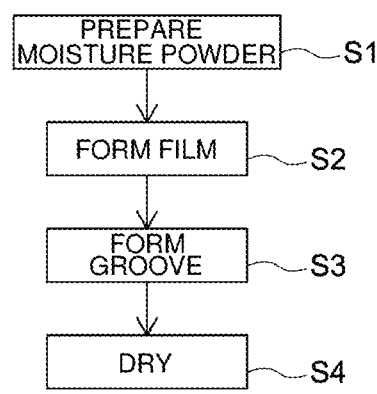
FIG. 1 is a flowchart showing a rough operation of a method of producing an electrode according to one embodiment.

As shown in FIG. 1, roughly speaking, a method of producing an electrode disclosed here includes the following four steps: (1) a step in which a moisture powder (electrode material) is prepared (S1); (2) a step in which a coating film composed of the moisture powder is formed (S2); (3) a step in which a groove extending in a transport direction is formed on the coating film (S3); and (4) a step in which the coating film is dried (S4), and is characterized in that a groove extending in the transport direction is formed on the coating film before the drying step. Therefore, other steps are not particularly limited, and may have the same configuration as this type of conventional production method. Hereinafter, the steps will be described.

Figure 2:
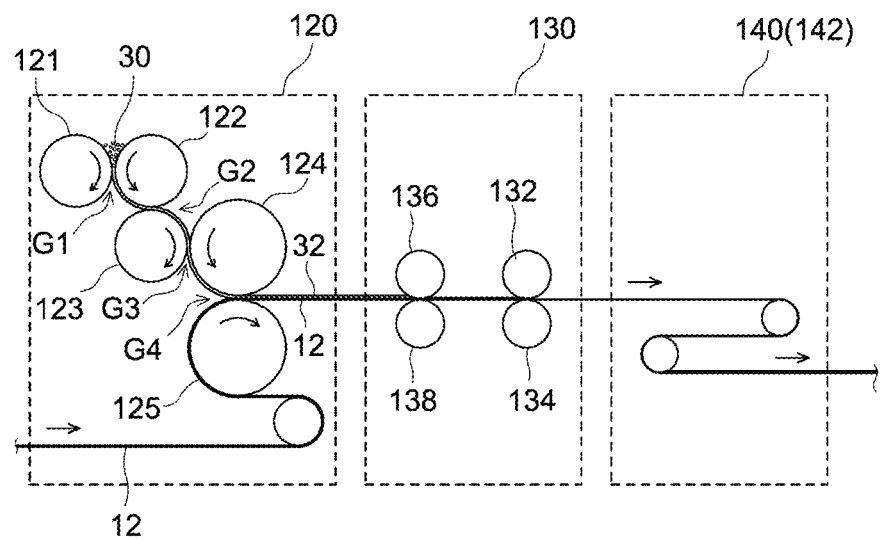
FIG. 2 is a block diagram schematically showing a configuration of an electrode production device according to one embodiment.

FIG. 2 is a block diagram schematically showing a schematic configuration of an electrode production device according to the method of producing an electrode disclosed here. An electrode production device 100 shown in FIG. 2 includes, typically, a film forming part 120 in which, while a sheet-shaped electrode current collector 12 that has been transported from a supply chamber (not shown) is transported in a longitudinal direction, a coating film 32 made of an electrode material 30 is formed on the surface of the electrode current collector 12, a coating film processing part 130 in which a groove extending in the transport direction is formed on the surface of the coating film 32, and a drying part 140 in which the coating film 32 is appropriately dried to form an electrode active material layer. These are disposed in order along a predetermined transport path.

Preparing Step

The electrode material 30 can be prepared by mixing an electrode active material, a solvent, a binder resin, and materials such as other additives using a conventionally known mixing device. Examples of such a mixing device include a planetary mixer, a ball miller, a roll miller, a kneader, and a homogenizer.

The electrode material 30 can have the form of a paste, a slurry, or a granulated component, and the granulated component, particularly, a moisture granulated component (moisture powder) containing a small amount of a solvent, is suitable for forming an electrode active material layer on the electrode current collector 12 in the electrode production device 100 disclosed here. Here, in this specification, the moisture powder morphological classification is described in "Particle Size Enlargement" by Capes C. E. (published by Elsevier Scientific Publishing Company, 1980), four classifications that are currently well known are used in this specification, and the moisture powder disclosed here is clearly defined. Specifically, it is as follows.

The existence form (filled state) of a solid component (solid phase), a solvent (liquid phase) and voids (gas phase) in the agglomerated particles constituting a moisture powder can be classified into four states: "pendular state," "funicular state," "capillary state," and "slurry state."

Figure 3A:
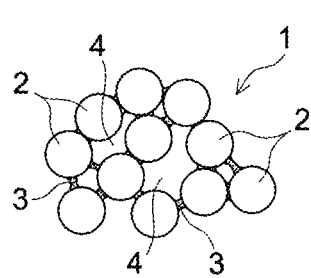
FIG. 3A to FIG. 3D show illustrative diagrams schematically showing existence forms of a solid phase (solid component such as active material particles), a liquid phase (solvent), and a gas phase (void) in agglomerated particles constituting a moisture powder, with FIG. 3A showing a pendular state, FIG. 3B showing a funicular state, FIG. 3C showing a capillary state, and FIG. 3D showing a slurry state.

Here, as shown in FIG. 3A, "pendular state" refers to a state in which a solvent (liquid phase) 3 is discontinuously present to crosslink active material particles (solid phase) 2 in an agglomerated particle 1, and the active material particles (solid phase) 2 may be present in a (continuous) state in which they are connected to each other. As shown, the content of the solvent 3 is relatively low, and as a result, most voids (gas phase) 4 present in the agglomerated particle 1 are continuously present and form communication holes that lead to the outside. In addition, one characteristic of the pendular state is that a continuous solvent layer is not observed over the entire outer surface of the agglomerated particle 1 in electron microscope observation (for example, scanning electron microscope (SEM) observation).

Figure 3B:
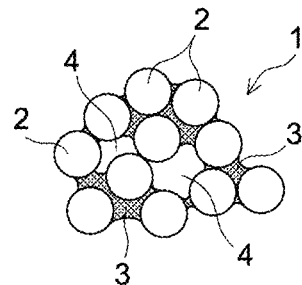

In addition, as shown in FIG. 3B, "funicular state" refers to a state in which the content of the solvent in the agglomerated particle 1 is relatively higher than that of a pendular state, and a state in which the solvents (liquid phase) 3 are continuously present around the active material particles (solid phase) 2 in the agglomerated particle 1. However, since the amount of the solvent is still small, as in the pendular state, the active material particles (solid phase) 2 are present in a (continuous) state in which they are connected to each other. On the other hand, among the voids (gas phase) 4 present in the agglomerated particle 1, the proportion of communication holes that lead to the outside decreases slightly, and the abundance proportion of the discontinuous isolated voids tends to increase, but the presence of communication holes is recognized.

The funicular state is a state between the pendular state and the capillary state, and in a funicular I state where the funicular state is divided into a funicular I state (that is, a state in which the amount of the solvent is relatively small) closer to the pendular state and a funicular II state (that is, a state in which the amount of the solvent is relatively large) closer to the capillary state, it still includes a state in which no solvent layer is observed on the outer surface of the agglomerated particle 1 in electron microscope observation.

Figure 3C:
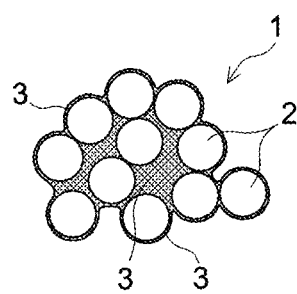

As shown in FIG. 3C, in the "capillary state," the content of the solvent in the agglomerated particle 1 increases, the amount of the solvent in the agglomerated particle 1 becomes close to a saturated state, a sufficient amount of the solvent 3 is continuously present around the active material particles 2, and as a result, the active material particles 2 are present in a discontinuous state. For voids (gas phase) present in the agglomerated particle 1, almost all voids (for example, 80 vol % of a total void volume) are present as isolated voids due to the increase in the amount of the solvent, and the abundance proportion of voids in the agglomerated particle 1 also becomes small.

Figure 3D:
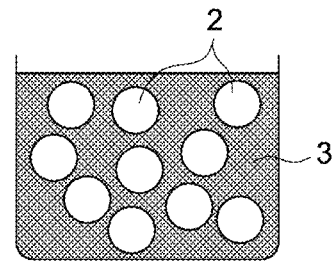

As shown in FIG. 3D, "slurry state" refers to a state in which the active material particles 2 have already been suspended in the solvent 3, and a state that cannot be called agglomerated particles. There is almost no gas phase.

In the related art, moisture powder sheeting in which a film is formed using a moisture powder is known, but in the conventional moisture powder sheeting, the moisture powder is in a so-called "capillary state" shown in FIG. 3C in which a liquid phase is continuously formed throughout the powder.

On the other hand, the moisture powder disclosed here is a moisture powder in which at least 50% or more of the agglomerated particles 1 form the pendular state or the funicular state (in particular, the funicular I state) (1). Preferably, the moisture powder has one morphological characteristic in which, when the gas phase is controlled, no layer formed of the solvent is observed over the entire outer surface of the agglomerated particles in electron microscope observation (2).

Hereinafter, the moisture powder disclosed here that satisfies the requirements (1) and (2) is referred to as a "gas-phase-controlled moisture powder."

Here, in the gas-phase-controlled moisture powder disclosed here, it is preferable that at least 50 number % or more of the agglomerated particles satisfy the requirements (1) and (2).

The gas-phase-controlled moisture powder can be produced according to a conventional process of producing a moisture powder in a capillary state. That is, when the amount of the solvent and the formulation of solid components (the active material particles, the binder resin, etc.) are adjusted so that the proportion of the gas phase is higher than in the related art, and specifically, many continuous voids (communication holes) that lead to the outside are formed in the agglomerated particles, it is possible to produce a moisture powder as an electrode material (electrode mixture) included in the pendular state or the funicular state (in particular, the funicular I state).

In addition, in order to realize a liquid crosslink between active materials with the smallest amount of the solvent, it is desirable that the surface of the powder material used and the solvent used have an appropriate affinity.

Preferably, examples of appropriate gas-phase-controlled moisture powders disclosed here include a moisture powder in which a three-phase state recognized in electron microscope observation is a pendular state or funicular state (in particular, the funicular I state) and "a ratio: Y/X of the true specific gravity Y to the loose bulk specific gravity X" calculated from a loose bulk specific gravity X (g/mL), which is an actually measured bulk specific gravity, measured by putting the obtained moisture powder into a container having a predetermined volume with leveling and without applying a force, and a raw-material-based true specific gravity Y (g/mL), which is a specific gravity calculated from the composition of the moisture powder assuming that there is no gas phase is 1.2 or more, preferably 1.4 or more (or 1.6 or more), and preferably 2 or less.

The electrode material 30 forming the electrode active material layer contains at least a plurality of electrode active material particles, a binder resin, and a solvent.

As the electrode active material which is a main component of the solid component, a compound having a composition used as a negative electrode active material or a positive electrode active material of a conventional secondary battery (here, a lithium ion secondary battery) can be used. Examples of negative electrode active materials include carbon materials such as graphite, hard carbon, and soft carbon. In addition, examples of positive electrode active materials include lithium transition metal composite oxides such as $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$, and lithium transition metal phosphate compounds such as $LiFePO_4$. The average particle size of the electrode active material is not particularly limited, and is suitably about 0.1 μm to 50 μm, and preferably about 1 to 20 μm. Here, in this specification, "average particle size" refers to a particle size ($D_{50}$, also referred to as a median diameter) corresponding to a cumulative frequency of 50 vol % from the fine particle end having a small particle size in a volume-based particle size distribution based on a general laser diffraction/light scattering method.

As the solvent, for example, N-methyl-2-pyrrolidone (NMP) or an aqueous solvent (water or a mixed solvent mainly composed of water) can be suitably used.

Examples of binder resins include polyvinylidene fluoride (PVDF), carboxymethyl cellulose (CMC), styrene butadiene rubber (SBR), and polyacrylic acid (PAA). An appropriate binder resin is used depending on the solvent used.

The electrode material 30 may contain a substance other than the electrode active material and the binder resin as the solid components, for example, a conductive material and a thickener. Preferable examples of conductive materials include carbon black, for example, acetylene black (AB), and carbon materials such as carbon nanotubes. In addition, as the thickener, for example, carboxymethyl cellulose (CMC) and methyl cellulose (MC) can be suitably used. The electrode material 30 may include materials (for example, various additives) other than the above materials.

Here, in this specification, "solid component" refers to a material (solid material) excluding the solvent among the above materials, and "solid component proportion" refers to a proportion of the solid component in the electrode material into which materials are mixed.

Wet granulation can be performed using the above materials to produce a desired moisture powder. Specifically, for example, respective materials are mixed using a stirring granulation machine (a mixer such as a planetary mixer) to produce a moisture powder (that is, an aggregate of agglomerated particles). This type of stirring granulation machine includes a mixing container that is typically cylindrical, a rotary blade accommodated in the mixing container, and a motor connected to the rotary blade (also referred to as a blade) via a rotating shaft.

In the preparing step S1, among the above materials, first, materials (solid components) excluding the solvent are mixed in advance to perform a solvent-less dry dispersion treatment. Therefore, a state in which respective solid components are highly dispersed is formed. Then, preferably, a solvent and other liquid components (for example, a liquid binder) are added to the dispersed mixture and additionally mixed. Accordingly, a moisture powder in which respective solid components are suitably mixed can be produced.

Specifically, an electrode active material which is a solid component and various additives (a binder resin, a thickener, a conductive material, etc.) are put into the mixing container of the stirring granulation machine, the motor is driven to rotate the rotary blade, for example, at a rotational speed of 2,000 rpm to 5,000 rpm for about 1 to 60 seconds (for example, 2 to 30 seconds), and thus a mixture of respective solid components is produced. Then, an appropriate amount of the solvent is weighed out so that the solid component is 70% or more, and more preferably 80% or more (for example, 85% to 98%), and is put into the mixing container, and a stirring granulation treatment is performed. Although not particularly limited, the rotary blade is additionally rotated, for example, at a rotational speed of 100 rpm to 1,000 rpm for about 1 to 60 seconds (for example, 2 to 30 seconds). Accordingly, respective materials and the solvent in the mixing container can be mixed to produce a moisture granulated component (moisture powder). Here, additionally, when stirring is intermittently performed at a rotational speed of about 1,000 rpm to 3,000 rpm for a short time of about 1 to 5 seconds, it is possible to prevent aggregation of the moisture powders. The particle size of the obtained granulated component can be, for example, 50 μm or more (for example, 100 μm to 300 μm).

In the gas-phase-controlled moisture powder disclosed here, a solid phase, a liquid phase, and a gas phase form a pendular state or a funicular state (preferably, the funicular I state), and the solvent content is low to the extent that no solvent layer is observed on the outer surface of the agglomerated particles in electron microscope observation (for example, the solvent proportion may be about 2 to 15% or 3 to 8%), and conversely, the gas phase part is relatively large.

In order to obtain such an existence form, in the above preparing step S1, various treatments and operations that can increase the gas phase can be incorporated. For example, during stirring granulation or after granulation, the granulated component may be exposed to a dry gas (air or inert gas) atmosphere heated to a temperature about 10 to 50 degrees higher than room temperature, and thus an excess solvent may be evaporated. In addition, in order to promote formation of agglomerated particles in the pendular state or funicular I state when the amount of the solvent is small, compressive granulation with a relatively strong compressive action may be used in order to adhere the active material particles and other solid components to each other. For example, a compressive granulation machine in which granulation is performed when a compressive force is applied between rollers while a powder raw material is supplied between a pair of rollers in a vertical direction may be used.

Film Forming Step

The production method disclosed herein is characterized in that the coating film 32 is formed while leaving a gas phase (void) of the electrode material 30. Formation of the coating film 32 composed of the electrode material 30 can be performed in, for example, the film forming part 120 schematically shown in FIG. 2. As shown, the film forming part 120 includes a plurality of continuous transfer rollers. In this example, it includes a first transfer roller 122 that faces a supply roller 121, a second transfer roller 123 that faces the first transfer roller, and a third transfer roller 124 that faces the second transfer roller and also faces a backup roller 125.

With such a configuration, the sizes of gaps G1 to G4 between rollers can be made different, and an appropriate coating film can be formed while maintaining communication holes for the moisture powder. This will be described below in detail.

In the film forming part 120, the outer circumferential surface of the supply roller 121 and the outer circumferential surface of the first transfer roller 122 face each other, and this pair of the supply roller 121 and the first transfer roller 122 rotate in directions opposite to each other as indicated by the arrows as shown in FIG. 2. In addition, the supply roller 121 and the first transfer roller 122 have a gap G1 with a predetermined width (thickness) according to a desired thickness of the coating film 32 formed on the electrode current collector 12, and it is possible to control the thickness of the coating film 32 composed of the electrode material 30 to be adhered to the surface of the first transfer roller 122 according to the size of the gap G1. In addition, by adjusting the size of the gap G1, it is possible to adjust a force with which the electrode material 30 that passes between the supply roller 121 and the first transfer roller 122 is compressed. Therefore, by making the gap size relatively large, it is possible to form a film when the gas phase of the electrode material 30 (specifically, each agglomerated particle) is maintained.

For the electrode material 30 compressed by the supply roller 121 and the first transfer roller 122, the second transfer roller 123 and the third transfer roller 124 form a film while adjusting the gas phase state of the electrode material 30. The second transfer roller 123 and the third transfer roller 124 rotate in directions opposite to each other as indicated by the arrows shown in FIG. 2. In addition, the second gap G2 is provided between the first transfer roller 122 and the second transfer roller 123, the third gap G3 is provided between the second transfer roller 123 and the third transfer roller 124, and when the gaps G2 and G3 are adjusted, the coating film 32 having a desired thickness and in a gas phase state can be produced.

The backup roller 125 has a function of transporting the electrode current collector 12 to the third transfer roller 124. The third transfer roller 124 and the backup roller 125 rotate in directions opposite to each other as indicated by the arrows shown in FIG. 2. In addition, the fourth gap G4 with a predetermined width (thickness) is provided between the third transfer roller 124 and the backup roller 125, and it is possible to control the thickness of the coating film 32 formed on the electrode current collector 12 depending on the size of the gap G4.

Regarding the electrode current collector 12, a metal electrode current collector used as an electrode current collector of this type of secondary battery can be used without particular limitation. When the electrode current collector 12 is a positive electrode current collector, the electrode current collector 12 is made of, for example, a metal material having favorable conductivity such as aluminum, nickel, titanium, or stainless steel. In particular, aluminum (for example, an aluminum foil) is preferable. When the electrode current collector 12 is a negative electrode current collector, the electrode current collector 12 is made of, for example, a metal material having favorable conductivity such as copper, an alloy mainly composed of copper, nickel, titanium, or stainless steel. In particular, copper (for example, a copper foil) is preferable. The thickness of the electrode current collector 12 is, for example, about 5 μm to 20 μm, and preferably 8 μm to 15 μm.

Since the supply roller 121, the first transfer roller 122, the second transfer roller 123, the third transfer roller 124 and the backup roller 125 are connected to independent driving devices (motors) (not shown), they can be rotated at different rotational speeds. Specifically, the rotational speed of the first transfer roller 122 is higher than the rotational speed of the supply roller 121, the rotational speed of the second transfer roller 123 is higher than the rotational speed of the first transfer roller 122, the rotational speed of the third transfer roller 124 is higher than the rotational speed of the second transfer roller 123, and the rotational speed of the backup roller 125 is higher than the rotational speed of the third transfer roller 124.

In this manner, when the rotational speed between rotary rollers is gradually increased in the current collector transport direction (traveling direction), it is possible to perform roll film formation.

The sizes of the gaps are set so that the first gap G1 is relatively a maximum, and the second gap G2, the third gap G3, and the fourth gap G4 are gradually reduced in this order (G1>G2>G3>G4). Since the gaps G1 to G4 are set so that the gaps gradually decrease in the transport direction (traveling direction) of the electrode current collector 12, film formation can be performed while adjusting the gas phase (void) state of the coating film 32. Although not particularly limited, the sizes (widths) of the gaps G1 to G4 may be set to be gap sizes so that the average film thickness of the coating film 32 during film forming is 10 μm or more and 300 μm or less (for example, 20 μm or more and 150 μm or less).

A partition wall (not shown) may be provided at both ends of the supply roller 121 and the first transfer roller 122 in the width direction. The partition wall holds the electrode material 30 on the supply roller 121 and the first transfer roller 122 and can define the width of the coating film 32 formed on the electrode current collector 12 by a distance between the two partition walls. The electrode material 30 is supplied between the two partition walls by a feeder (not shown) or the like.

The sizes of the supply roller 121, the first transfer roller 122, the second transfer roller 123, the third transfer roller 124 and the backup roller 125 are not particularly limited, and may be the same as those of the conventional film formation device, and for example, the diameters may be 50 mm to 500 mm. The diameters of the supply roller 121, the first to third transfer rollers 122, 123, and 124 and the backup roller 125 may be the same or different. In addition, the width of the coating film 32 formed may be the same as that of the conventional film formation device, and can be appropriately determined according to the width of the electrode current collector 12 on which the coating film 32 will be formed.

The materials of the outer circumferential surfaces of the supply roller 121, the first transfer roller 122, the second transfer roller 123, the third transfer roller 124 and the backup roller 125 may be the same as the material of the rotary roller in the conventional known film formation device, and examples thereof include SUS steel and SUJ steel. In order to prevent generation of metallic foreign substances, the materials of the outer circumferential surfaces of the supply roller 121 and the first to third transfer rollers 122, 123, and 124 that are in direct contact with the electrode material 30 are more preferably, for example, a ceramic such as zirconia, alumina, chromium nitride, aluminum nitride, titania, or chromium oxide.

Here, as an example, FIG. 2 show arrangement of the supply roller 121, the first transfer roller 122, the second transfer roller 123, the third transfer roller 124 and the backup roller 125, but the arrangement of these rollers is not limited thereto.

Groove Forming Step

Figure 4:
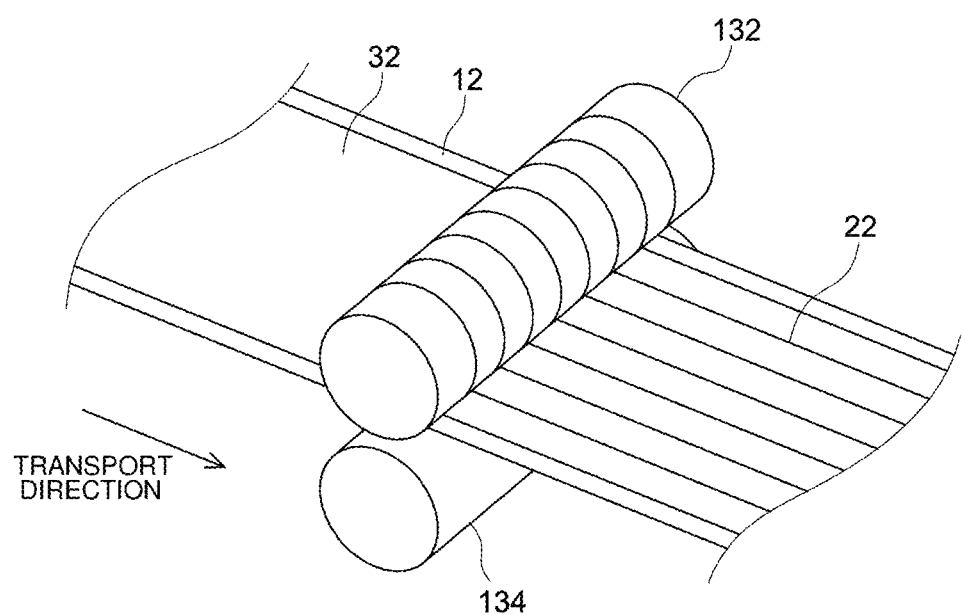
FIG. 4 is a diagram schematically showing a groove forming step according to one embodiment.

A groove 22 that extends in the transport direction with respect to the coating film 32 can be formed using, for example, a concavo-convex transfer roller 132 and a backup roller 134 as shown in FIG. 2 and FIG. 4. As shown, the concavo-convex transfer roller 132 has a convex part that extends perpendicular to the rotating shaft along the outer circumferential surface.

In the method of producing an electrode disclosed here, the concavo-convex forming step S3 is carried out on the coating film 32 formed while leaving voids (gas phases). The average porosity (gas phase rate) of the coating film 32 preferably at least 1% or more, and may be, for example, 1% or more 55% or less, typically 5% or more 55% or less. If the groove 22 is formed when the gas phase remains, since the spreadability is improved, a desired groove can be imparted to the coating film 32 with a load smaller than in the related art. In addition, even if a load is applied to form the groove 22, the groove 22 can be formed on the surface part of the coating film 32 without locally increasing the density (densification).

Here, in this specification, the "average porosity (gas phase rate) of the coating film" can be calculated by, for example, observing the cross section of the electrode active material layer using an electron microscope (SEM). The cross-section image is subjected to binarization processing so that the solid phase or liquid phase part turns white and the gas phase (void) part turns black using image analysis software "ImageJ" which is an open source and well-known as public domain image processing software. Thereby, "S2/(S1+S2)×100" can be calculated where an area of a part (white part) in which a solid phase or a liquid phase is present is called S1, and an area of a void part (black part) is called S2. This is defined as a porosity of the coating film before drying. A plurality of cross-sectional SEM images are acquired (for example, 5 or more images), and the average value of the porosities is defined as an "average porosity (gas phase rate) of the coating film" before drying. Here, the "average porosity (gas phase rate) of the coating film" does not include a groove (that is, macro voids) formed in the process of groove forming.

The concavo-convex transfer roller 132 has a convex part that extends perpendicular to the rotating shaft in order to form the groove 22 on the surface of the coating film 32. The backup roller 134 is a roller for feeding the transported electrode current collector 12 in the transport direction of the arrow while supporting it. The concavo-convex transfer roller 132 and the backup roller 134 are disposed at opposite positions. When the coating film 32 on the electrode current collector 12 passes through the gap between the concavo-convex transfer roller 132 and the backup roller 134, the convex part of the concavo-convex transfer roller 132 is transferred to the surface of the coating film 32, and thus a groove 22 can be formed on the surface of the coating film 32. The linear pressure of the concavo-convex transfer roller 132 is not particularly limited because it may vary depending on the depth of the groove of a desired shape and the like, but can be set to about 15 N/cm to 75N/cm, for example, about 25 N/cm to 65 N/cm.

The grooves 22 are transferred so that at least one groove 22 is formed in the center of the surface part of the coating film 32. When one groove 22 is formed in the center of the surface part of the coating film 32, it is possible to suitably minimize the occurrence of cracks and wrinkles at irregular intervals in the drying step S4. At least one groove 22 may be formed, and a plurality of grooves 22 may be formed as shown in the drawing. When a plurality of grooves 22 are formed, the above effect is better exhibited. When a plurality of grooves 22 are formed, the pitch between the grooves may be, for example, 500 μm or more and 5 mm or less, 750 μm or more and 4 mm or less, or 1 mm or more and 3 mm or less.

Here, in this specification, a "groove" is a continuous depression (typically an elongated depression) and does not include a discontinuous depression.

When the groove depth of the groove 22 is too shallow, the effect of minimizing the occurrence of cracks and wrinkles at irregular intervals in the coating film 32 is reduced. In addition, when the groove depth is too deep, this is not preferable because there is a risk of metallic lithium being precipitated due to a decrease in battery capacity or a difference in battery capacity between a positive electrode and a negative electrode. In this regard, when the average film thickness of the coating film 32 is $t_1$ (μm), and the depth of the groove 22 is $t_2$ (μm), the groove may be formed with a depth that satisfies the relationship of $(9/10 \times t_1) > t_2$. The depth of the groove 22 is, for example, preferably $(9/10 \times t_1) > t_2 > (1/10 \times t_1)$, and more preferably $(8/10 \times t_1) \geq t_2 > (3/10 \times t_1)$. When a plurality of grooves 22 are formed, the depth $t_2$ of the grooves 22 may be the same or different. When grooves are formed at different depths, it is preferable to form the coating film 32 so that the depth of the groove 22 in the central part is deeper than the depth of the groove 22 at the end of the coating film 32 in the width direction. Cracks and wrinkles at irregular intervals occurring in the coating film 32 tend to be unevenly distributed in the central part. Therefore, when the groove 22 is relatively deeply formed in the center of the surface part of the coating film 32, it is possible to more effectively minimize the occurrence of cracks and wrinkles at irregular intervals in the coating film 32.

In addition, the groove width of the groove 22 to be formed is not particularly limited, and may be, for example, 10 μm or more and 1,000 μm or less, 50 μm or more and 800 μm or less, or 100 μm or more and 600 μm or less.

In addition, the coating film processing part 130 may further include a mechanism for adjusting the film thickness and the gas phase state of the coating film 32 using a pressing roller 136 and a backup roller 138. The pressing roller 136 is a roller for pressing and compressing the coating film 32 in the film thickness direction, and the backup roller 138 is a roller for feeding the transported electrode current collector 12 in the transport direction while supporting it. The pressing roller 136 and the backup roller 138 are disposed at opposite positions. For example, the coating film 32 formed (film-formed) on the transported electrode current collector 12 can be pressed and compressed to the extent that no isolated voids are generated. Thereby, the gas phase state of the coating film 32 can be adjusted so that grooves are more suitably formed. An appropriate pressing pressure of the pressing roller 136 and the backup roller 138 is not particularly limited because it may vary depending on the film thickness and density of a desired coating film (electrode active material layer), and can be set to, for example, 0.01 MPa to 100 MPa, for example, about 0.1 MPa to 70 MPa.

In the coating film 32, when the gas phase remains, even if the groove is formed before the drying step S4, a desired groove is formed, and the shape of the groove can be maintained. In addition, more suitably, the coating film 32 formed using the gas-phase-controlled moisture powder is preferable. As described above, since the gas-phase-controlled moisture powder is formed into a film while communication holes are maintained, it is possible to more suitably form a desired groove and maintain the groove shape.

Drying Step

As shown in FIG. 2, a drying furnace 142 including a heating device (heater) (not shown) as the drying part 140 is disposed downstream from the coating film processing part 130 of the electrode production device 100 in the transport direction according to the present embodiment. In the drying part 140, the coating film 32 formed on the electrode current collector 12 is dried to form an electrode active material layer. The drying method is not particularly limited, and examples thereof include hot air drying and infrared drying.

The drying temperature (temperature in the drying furnace) in the drying step S4 is not particularly limited because it varies depending on the type of a solvent used, a solid component proportion of the coating film 32 and the like, and is, for example, set to 80° C. or higher, typically 100° C. or higher, and preferably 120° C. or higher. The upper limit of the drying temperature is not particularly limited, and in order to prevent oxidation of the electrode current collector 12, is set to, for example, 200° C. or lower, typically 190° C. or lower, and preferably 180° C. or lower.

In order to improve the productivity, the transport speed in the drying step S4 is, for example, preferably set to 1 m/min or more, and more preferably set to 3 m/min or more. If the transport speed is too high, since the coating film 32 is likely to crack, in this regard, the transport speed may be set to 15 m/min or less, 10 m/min or less, or 8 m/min or less.

Generally, when a coating film composed of a conventional slurry-like electrode material is dried at a relatively high temperature (for example, 100° C. or higher) or a relatively high transport speed (for example, 8 m/min or more), "migration" occurs, which is a phenomenon in which a binder having a small specific gravity segregates on the surface side. When such "migration" occurs, the adhesion between the electrode current collector 12 and the electrode active material layer decreases, and during the producing step or during repeated charging/discharging, the active material layer is easily separated from the current collector 12. On the other hand, in the method of producing an electrode disclosed here, in particular, when the electrode active material layer produced using the gas-phase-controlled moisture powder is uniformly divided into two layers, an upper layer and a lower layer, in the thickness direction from the surface of the active material layer to the electrode current collector, and the concentrations (mg/L) of binder resins of the upper layer and the lower layer are C1 and C2, they have a relationship of $0.8 \leq (C1/C2) \leq 1.2$. That is, the electrode active material layer may be an electrode active material layer in which binder segregation (migration) is unlikely to occur between the upper layer and the lower layer.

When the gas-phase-controlled moisture powder is used as the electrode material 30, the solid component proportion can be largely increased as compared with the coating film composed of a slurry-like electrode material. Thereby, even if the time of the drying step S4 is shortened (for example, the temperature in the drying furnace is set high or the transport speed in the drying step S4 is set high, etc.), the occurrence of "migration" can be minimized. Therefore, according to the method of producing an electrode disclosed here, it is possible to produce a (high-quality) electrode for a secondary battery having improved durability without impairing productivity.

Also in the coating film 32 using a moisture powder or gas-phase-controlled moisture powder whose solid component proportion is higher than in the conventional slurry-like electrode material as the electrode material 30, cracks and wrinkles at irregular intervals are unevenly distributed in the central part of the coating film 32 in the drying step S4. Due to the occurrence of such cracks and wrinkles, in addition to the deterioration of battery performance such as a decrease in the capacity due to a defective electrode, the defective part of the electrode may become a foreign substance, and there are risks of a failure of the production device and breakage of the electrode current collector 12.

Figure 5A:
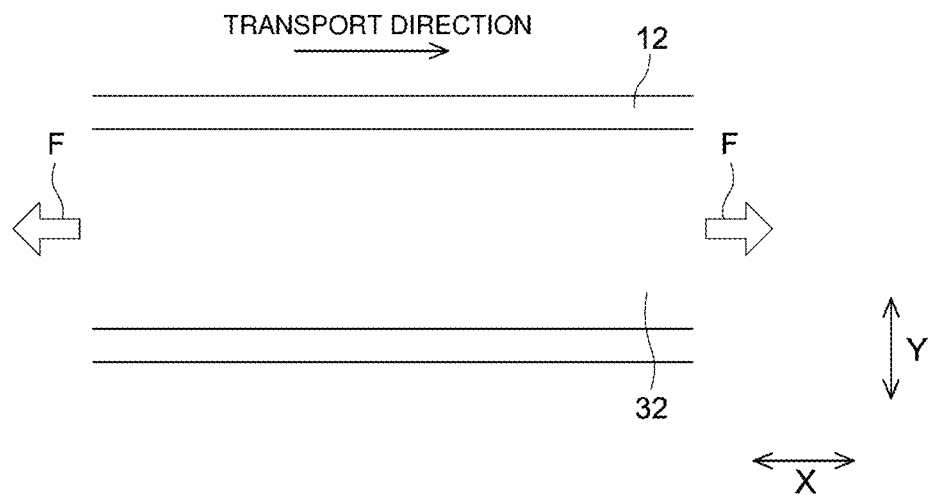
FIG. 5A and FIG. 5B show diagrams schematically showing a procedure in which irregular cracks and wrinkles occur in a coating film in the conventional method of producing an electrode, with FIG. 5A showing a state before irregular cracks and wrinkles occur, and FIG. 5B showing a state after irregular cracks and wrinkles occur.
Figure 5B:
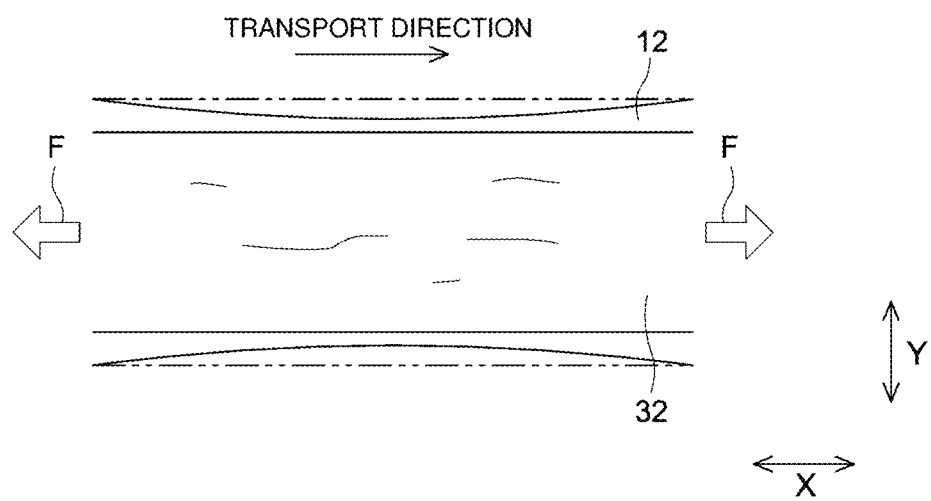

According to the results of examination performed by the inventors, it has been found that, as shown in FIG. 5A and FIG. 5B, such cracks and wrinkles occur because the coating film 32 cannot conform to deformation in which, when the electrode current collector 12 is transported in the transport direction (X direction) while being stretched with a certain force and heated in the drying step, the current collector 12 extends in the transport direction (X direction), and at the same time, contracts in a direction (Y direction) orthogonal to the transport direction. Specifically, as indicated by the arrow F in FIG. 5A, the current collector 12 is always transported in a state in which a substantially constant tension (for example, 10 N to 50 N) is applied. When the current collector 12 is transported in a state in which such a tension is applied, and the drying step S4 is performed typically at 80° C. or higher, the current collector 12, which is a metal foil, has improved ductility and is easily deformed. Therefore, as shown in FIG. 5B, the current collector 12 can extend in the transport direction (X direction) and at the same time, can contract in a direction (Y direction) orthogonal to the transport direction. The coating film 32 on the current collector 12 is in a state in which the spreadability is reduced due to evaporation (volatilization) of the solvent in the drying step S4. Then, the volume is reduced by evaporation (volatilization) of the solvent, but the deformation of the current collector 12 is larger than that. Therefore, the coating film 32 cannot conform to deformation of the current collector 12, and cracks and wrinkles at irregular intervals are unevenly distributed particularly in the central part.

On the other hand, in the method of producing an electrode disclosed here, at least one groove is formed in the center of the surface part of the coating film 32 in the step before the drying step S4. Thereby, since the conformability of the coating film 32 with respect to the electrode current collector 12 is improved, it is possible to minimize the occurrence of cracks and wrinkles at irregular intervals.

After the drying step S4, as necessary, roll pressing may be performed by a roll rolling mill. The linear pressure during roll pressing is preferably set to, for example, a linear pressure of about 1 ton/cm to 6 ton/cm. Thereby, a long sheet-shaped electrode for a lithium ion secondary battery is produced.

The sheet-shaped electrode produced in this manner is used for constructing a lithium ion secondary battery as a general sheet-shaped positive electrode or negative electrode of this type.

Figure 6:
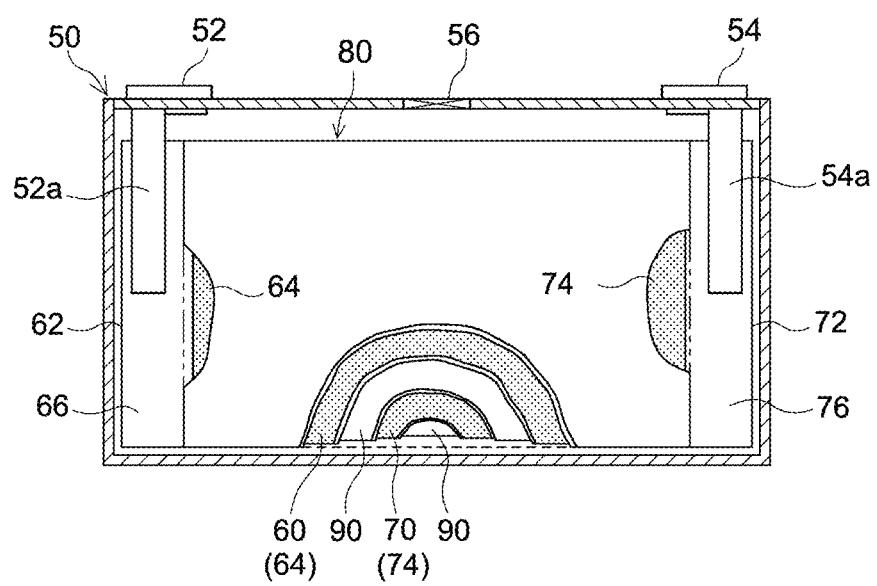
FIG. 6 is an illustrative diagram schematically showing a lithium ion secondary battery according to one embodiment.

FIG. 6 shows an example of a lithium ion secondary battery 200 that can be constructed using the electrode produced by the method of producing an electrode disclosed here.

The lithium ion secondary battery 200 shown in FIG. 6 is constructed by accommodating the flat wound electrode body 80 and a non-aqueous electrolyte (not shown) in a sealable box-shaped battery case 50. In the battery case 50, a positive electrode terminal 52 and a negative electrode terminal 54 for external connection, and a thin-walled safety valve 56 that is set, when an internal pressure of the battery case 50 increases to a predetermined level or more, to release the internal pressure are provided. In addition, an injection port (not shown) for injecting a non-aqueous electrolyte is provided in the battery case 50. The positive electrode terminal 52 and a positive electrode current collecting plate 52a are electrically connected. The negative electrode terminal 54 and a negative electrode current collecting plate 54a are electrically connected. The material of the battery case 50 is preferably a metal material having a high strength, lightweightness, and favorable thermal conductivity, and examples of such metal materials include aluminum and steel.

The wound electrode body 80 typically has a form in which a long sheet-shaped positive electrode (hereinafter referred to as a positive electrode sheet 60) and a long sheet-shaped negative electrode (hereinafter referred to as a negative electrode sheet 70) overlap with a long sheet-shaped separator 90 therebetween, and are wound in the longitudinal direction. The positive electrode sheet 60 has a configuration in which a positive electrode active material layer 64 is formed on one surface or both surfaces of a positive electrode current collector 62 in the longitudinal direction. The negative electrode sheet 70 has a configuration in which a negative electrode active material layer 74 is formed on one surface or both surfaces of a negative electrode current collector 72 in the longitudinal direction. On one edge of the positive electrode current collector 62 in the width direction, a part in which the positive electrode active material layer 64 is not formed along the edge, and the positive electrode current collector 62 is exposed (that is, a positive electrode current collector exposed part 66) is provided. On the other edge of the negative electrode current collector 72 in the width direction, a part in which the negative electrode active material layer 74 is not formed along the edge and the negative electrode current collector 72 is exposed (that is, a negative electrode current collector exposed part 76) is provided. The positive electrode current collecting plate 52a and the negative electrode current collecting plate 54a are bonded to the positive electrode current collector exposed part 66 and the negative electrode current collector exposed part 76.

For the positive electrode (the positive electrode sheet 60) and the negative electrode (the negative electrode sheet 70), the positive electrode and the negative electrode obtained by the above production method are used. Here, in this configuration example, in the positive electrode and the negative electrode, an electrode active material layer (the positive electrode active material layer 64 and the negative electrode active material layer 74) is formed on both surfaces of the current collector 12 (the positive electrode current collector 62 and the negative electrode current collector 72).

Regarding the separator 90, for example, a porous sheet (film) made of a resin such as polyethylene (PE), polypropylene (PP), polyester, cellulose, and polyamide may be exemplified. Such a porous sheet may have a single-layer structure, or a laminate structure of two or more layers (for example, a three-layer structure in which a PP layer is laminated on both surfaces of a PE layer). In the separator 90, a heat resistant layer (HRL) may be provided.

Regarding the non-aqueous electrolyte, those used in the lithium ion secondary batteries in the related art can be used, and typically an organic solvent (non-aqueous solvent) containing a supporting salt can be used. Regarding the non-aqueous solvent, organic solvents such as carbonates, esters, ethers, nitriles, sulfones, and lactones can be used without particular limitation. Specifically, for example, non-aqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC), and trifluorodimethyl carbonate (TFDMC) can be suitably used. These non-aqueous solvents may be used alone or two or more thereof may be appropriately used in combination. Regarding the supporting salt, for example, a lithium salt such as $LiPF_6$, $LiBF_4$, and $LiClO_4$ can be suitably used. The concentration of the supporting salt is not particularly limited, and is preferably about 0.7 mol/L or more and 1.3 mol/L or less.

Here, as long as the effects of the present disclosure are not significantly impaired, the non-aqueous electrolyte solution may contain components other than the above non-aqueous solvent and supporting salt, for example, various additives such as a gas generating agent, a film forming agent, a dispersant, and a thickener.

The lithium ion secondary battery 200 configured as described above can be used for various applications. Examples of appropriate applications include drive power supplies mounted in vehicles such as battery electric vehicles (BEV), hybrid electric vehicles (HEV), and plug-in hybrid electric vehicles (PHEV). The lithium ion secondary battery 200 can be used in the form of an assembled battery in which a plurality of batteries are connected in series and/or parallel.

While examples related to the method of producing an electrode disclosed here will be described below, the technology disclosed here is not intended to be limited to what is shown in the examples.

EXAMPLE

A gas-phase-controlled moisture powder that can be suitably used as a negative electrode material was produced, and a negative electrode active material layer was then formed on a copper foil using the produced moisture powder (negative electrode material).

In this test example, a graphite powder having an average particle size ($D_{50}$) of 10 μm based on a laser diffraction/scattering method was used as a negative electrode active material, styrene butadiene rubber (SBR) was used as a binder resin, carboxymethyl cellulose (CMC) was used as a thickener, and water was used as the solvent.

First, solid components including 98 parts by mass of the negative electrode active material, 1 part by mass of SBR and 1 part by mass of CMC were put into a stirring granulation machine (a planetary mixer or a high speed mixer), and mixed and stirred.

Specifically, in the stirring granulation machine having a mixing blade, the rotational speed of the mixing blade was set to 4,500 rpm, a stirring and dispersion treatment was performed for 15 seconds, and thereby a powder material mixture composed of the solid components was obtained. Water as the solvent was added to the obtained mixture so that the solid component proportion was 90 wt %, stirring granulation compositing was performed at a rotational speed of 300 rpm for 30 seconds, stirring was then performed at a rotational speed of 4,500 rpm for 2 seconds, and refining was performed. Thereby, a moisture powder (negative electrode material) according to this test example was produced.

Next, the obtained gas-phase-controlled moisture powder (negative electrode material) was supplied to a film forming part of the electrode production device, and a coating film was transferred to the surface of a negative electrode current collector made of a copper foil prepared separately. The average film thickness of the coating film in this case was 106 μm.

The coating film was transported to the coating film processing part, grooves were formed by a concavo-convex transfer roller, and the grooves extending in a transport direction were formed at a predetermined pitch so that the groove depth was 64 μm. The coating film was dried in the drying part under conditions of a drying temperature (temperature in the drying furnace) of 120° C. and a transport speed of 8 m/min.

Comparative Example 1

As a comparison target, an electrode active material layer having no grooves was dried under the above conditions. Specifically, electrode materials were mixed in the same manner as in Example 1, and a coating film was transferred to the surface of a negative electrode current collector made of a copper foil prepared separately. The coating film was dried in the drying part under conditions of a drying temperature (temperature in the drying furnace) of 120° C. and a transport speed of 8 m/min.

When the surface of the dried coating film was visually observed, no irregular wrinkles and cracks occurred in the coating film of Example 1. On the other hand, in the coating film of Comparative Example 1, irregular wrinkles and cracks occurred in the coating film, and were unevenly distributed particularly in the central part.

That is, when grooves extending in a transport direction were formed in the center of the surface part of the coating film and then dried so that the groove depth $t_2$ (μm) of the groove satisfied $(9/10 \times t_1) > t_2$, it was possible to further improve conformability of the coating film with respect to the electrode current collector and minimize the occurrence of cracks and wrinkles at irregular intervals.

While specific examples of the present disclosure have been described above in detail, these are only examples, and do not limit the scope of the claims. The technologies described in the claims include various modifications and alternations of the specific examples exemplified above.

What is claimed is:

1. A method of producing an electrode for a secondary battery having any electrode current collector of positive and negative electrodes and an electrode active material layer, the method comprising:
    a step in which a moisture powder formed of agglomerated particles containing at least an electrode active material, a binder resin, and a solvent is prepared, with a solid phase, a liquid phase, and a gas phase in at least 50 number % or more of the agglomerated particles forming a pendular state or a funicular state in the moisture powder;
    a step in which by using the moisture powder, a coating film composed of the moisture powder is formed on the electrode current collector, with a gas phase of the coating film being remained, and with an average film thickness $t_1$ (μm) of the coating film being 50 μm or more;
    a step in which the coating film on the electrode current collector is transported, concavo-convex transfer is performed using a roll mold, and thus at least one groove extending in a transport direction is formed in a center of a surface part of the coating film, with the groove being formed to have a depth $t_2$ (μm) satisfying $(9/10 \times t_1) > t_2$; and
    a step in which the coating film formed on the electrode current collector is dried to form an electrode active material layer.

2. The method of producing an electrode for a secondary battery according to claim 1,
    wherein, in the moisture powder prepared in the step in which the moisture powder is prepared, when a bulk specific gravity measured by putting a moisture powder (g) into a container having a predetermined volume (mL) with leveling and without applying a force is set as a loose bulk specific gravity X (g/mL), and a specific gravity calculated from the composition of the moisture powder assuming that there is no gas phase is set as a true specific gravity Y (g/mL), a ratio: Y/X of the true specific gravity Y to the loose bulk specific gravity X is 1.2 or more.

3. The method of producing an electrode for a secondary battery according to claim 1,
    wherein, in the step in which the at least one groove extending in the transport direction is formed, the at least one groove is formed in plurality on the coating film.

4. The method of producing an electrode for a secondary battery according to claim 3,
    wherein, in the step in which the at least one groove extending in the transport direction is formed, a groove present in a central part in a width direction is formed to be deeper than a groove present at an end of the coating film in a width direction orthogonal to the transport direction.

* * * * *